(12) United States Patent
Piller (10) Patent No.: US 6,622,175 B1
(45) Date of Patent: Sep. 16, 2003

(54) SYSTEM AND METHOD FOR COMMUNICATIONS IN A DISTRIBUTED PROCESSING ENVIRONMENT (75) Inventor: Mark Piller, Dallas, TX (US)

(73) Assignee: Recursion Software, Inc., Frisco, TX (US)

( * ) Notice: Subject to any disclaimer, the term of this patent is extended or adjusted under 35 U.S.C. 154(b) by 0 days.

(21) Appl. No.: 09/451,502

(22) Filed: Nov. 30, 1999

(51) Int. Cl.[7] ................................................ G06F 9/46
(52) U.S. Cl. ....................................................... 709/313
(58) Field of Search ................................ 709/203, 316, 709/201, 315, 313

(56) References Cited

U.S. PATENT DOCUMENTS

| | | | | |
|---|---|---|---|---|
| 5,793,965 A | * | 8/1998 | Vanderbilt et al. | 709/201 |
| 6,012,067 A | * | 1/2000 | Sarkar | 707/103 R |
| 6,151,639 A | * | 11/2000 | Tucker et al. | 709/203 |
| 6,182,154 B1 | * | 1/2001 | Campagnoni et al. | 709/315 |
| 6,182,155 B1 | * | 1/2001 | Cheng et al. | 709/315 |
| 6,230,160 B1 | * | 5/2001 | Chan et al. | 707/102 |
| 6,253,253 B1 | * | 6/2001 | Mason et al. | 709/315 |
| 6,260,078 B1 | * | 7/2001 | Fowlow | 709/316 |
| 6,347,342 B1 | * | 2/2002 | Marcos et al. | 709/310 |
| 6,385,661 B1 | * | 5/2002 | Guthrie et al. | 709/203 |
| 6,405,246 B1 | * | 6/2002 | Hutchison | 709/203 |

* cited by examiner

Primary Examiner—Marc D. Thompson
(74) Attorney, Agent, or Firm—Baker Botts L.L.P.

(57) ABSTRACT

A system for communication in a distributed computing environment (100) is provided and includes a server system (12) having one or more server objects (106) and a client system (14) having a client application (104). The client system (14) is linked to the server system (12) by a network (102). An object request broker (108) executes on the server system (12) and provides server-side communications support for the distributed computing environment (100). A light client (116) executes on the client system (14) and provides client-side communications support for the distributed computing environment (100). The light client (116) communicates with the object request broker (108) to provide client system (14) to server system (12) communications. A light proxy (118) is dynamically generated in response to a request from the client application (104) for access to one of the one or more server objects (106). The light proxy (118) is uploaded to the client system (14) in response to the request for access by the client application (104). The light proxy (118) also provides a local communication link between the client application (104) and the light client (116).

17 Claims, 5 Drawing Sheets

SYSTEM AND METHOD FOR COMMUNICATIONS IN A DISTRIBUTED PROCESSING ENVIRONMENT

TECHNICAL FIELD OF THE INVENTION

This invention relates in general to the field of software systems, and more particularly to an improved system and method for communications in a distributed processing environment.

BACKGROUND OF THE INVENTION

Object oriented programming is a method of programming that abstracts a computer program into manageable sections. The basis of object oriented programming is the concept of encapsulation. Encapsulation is a methodology that combines the subroutines, or methods, that manipulate data with the declaration and storage of that data. This encapsulation prevents the data from arbitrarily being accessed by other program subroutines, or objects. When an object is invoked, the associated data is available and can be manipulated by any of the methods that are defined within the object to act upon the data. The basic component of encapsulation is a class. A class is an abstraction for a set of objects that share the same structure and behavior. An object is a single instance of a class that retains the structure and behavior of the class. Objects also contain methods that are the processes that instruct an object to perform some procedure or manipulation of data that the object controls. Classes may also be characterized by their interface which defines the elements necessary for proper communication between objects.

Distributed computing allows an object on one computer system to seamlessly communicate with and manipulate an object contained in a second computer system when these computers are connected by a computer network. The second computer system may also be referred to as another address space. Sophisticated distributed computing systems have removed the communications burden from the computer programs, or objects in an object oriented programming environment, and placed it in a mid-level operating system that manages communications across a computer network to facilitate a client's access to and manipulation of data contained on a server system. The server system could be a computer in a different address space and remote to a user on the client system.

Distributed computing and object oriented programming have led to the development of distributed object management systems. These distributed object management systems are generally referred to as object request brokers (ORBs). When an object on a client computer system requests access to an object that exists on a server computer system, the distributed object management system steps in to facilitate the communication between the two computer systems and, thus, between the two objects. The distributed object management system removes the requirement of the client object communicating directly with the server object. Instead, current distributed object management systems utilize a remote proxy object on the client system which models the interface of the server object. The client computer system that requested access to the server object, communicates with the remote proxy object that exists on the client computer system. Therefore, the client computer system can operate as if it is communicating directly with a local object. The remote proxy object contains the necessary communications information to allow the client computer system to access and manipulate an object that actually exists on the server computer system. Remote proxies allow the client system to disregard the location of the requested object and the communication details.

A proxy is an object that has an interface and method list identical to another object. However, it does not contain the same detailed computer code. Instead it contains communications requirements that allow the proxy to communicate directly with another object without knowledge of the requesting object. Proxies can be used to control access to certain objects. They may also be used to remove the labor of distributed processing communications from local objects. For example, if object A residing on a first computer system needs to communicate with object B residing on a second computer system, object A must know the location of object B and have the necessary computer code to initiate communications with object B. A proxy for object B located on the first computer system allows object A to simply communicate with the proxy of object B as if object B resided on the same computer. The proxy for Object B has all the necessary information and computer code to communicate with the real object B on the second computer system. This type of proxy is known as a remote proxy since it exists on a computer system remote from the computer system that contains the requested object.

Systems heretofore known have required all possible remote proxies to be built when the software system is initially compiled and loaded onto a computer. This process can be very time consuming and the resultant remote proxies can require large amounts of computer storage. In addition, software system designers must predict every possible remote proxy that may be needed in the future so that it can be built when the software system is loaded. This process does not allow a system to adapt to its usage and environment.

With the rise of distributed computing systems, client/server computing, and internet/intranet interactions, inter-node communications between applications and objects has become a necessity. Early operating systems lacked support for inter-application communications, forcing software developers to write custom code to perform a remote procedure call for each and every application that needed remote communications.

Distributed computing systems often use a client/server architecture. Typically, a client is an application that runs on a personal computer and relies on a server to perform some operations. The server is a computer on a network that manages network resources such as storage devices, printers, or network traffic. Client-side operations are those occurring on the client side of a client/server system. For example, on the world wide web, applets may be downloaded and executed on a client and are client-side operations. Server-side operations occur on the server of a client/server system. For example, management services performed by the server occur on the server machine and are server-side operations. Client/server systems require communications and operations to take place across a network. ORBs facilitate these communications and operations across the network.

Microsoft has developed DCOM (Distributed Component Object Model) to support inter-application communications across networked computer systems. Another technology standard for inter-object communications is CORBA (Common Object Request Broker Architecture) established by the Object Management Group (OMG) which is a consortium sponsored by many companies, including Digital Equipment Corporation, Hewlett Packard, IBM and Sun Microsystems, Inc. CORBA defines how messages from one object to another are to be formatted and how to guarantee delivery. The messaging in CORBA is performed by Object Request Brokers (ORBs). ORBs receive messages and determine location of the receiving object, route the message to the receiving object, and perform all necessary platform and language translations. In object oriented technology, a message is typically a request sent to an object to change its state or return a value. The object has encapsulated methods to implement the response to the received message. Through technology such as DCOM and CORBA, objects can communicate with remote objects residing in other computer platforms connected by a network. However, for communications between objects in separate computer platforms to take place, an ORB needs to exist on each computer platform to send and receive messages.

ORBs provide communications between client and server systems. The ORB should exist on both the client system and the server system before communications between a client object and a server object can commence. If a client system does not have an ORB, the ORB of the server system is generally uploaded to the client system before communications commence. The upload of the ORB over a common internet connection can be slow, lengthy, and monopolize considerable system resources.

SUMMARY OF THE INVENTION

Accordingly, a need has arisen for a system and method for communications in a distributed processing environment that minimizes the size of the object request broker uploaded to a client system.

According to one embodiment of the present invention, a system for communication in a distributed computing environment is provided that includes a server system having one or more server objects and a client system having a client application. The client system is linked to the server system by a network. An object request broker executes on the server system and provides server-side communications support. A light client executes on the client system and provides client-side communications support. The light client communicates with the object request broker to provide client system to server system communications. A light proxy is dynamically generated in response to a request from the client application for access to one of the one or more server objects. The light proxy is uploaded to the client system in response to the request for access from the client application. The light proxy further provides a local communication link between the client application and the requested server object.

The present invention provides various technical advantages over conventional systems for communication in a distributed computing environment. For example, one technical advantage is providing a reduced size communications support module to provide client side communications support in the distributed computing environment. In addition, the reduced size communications support module significantly reduces the time needed to upload an applet or application onto a client system. Other technical advantages may be readily apparent to one skilled in the art from the following figures, description and claims.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
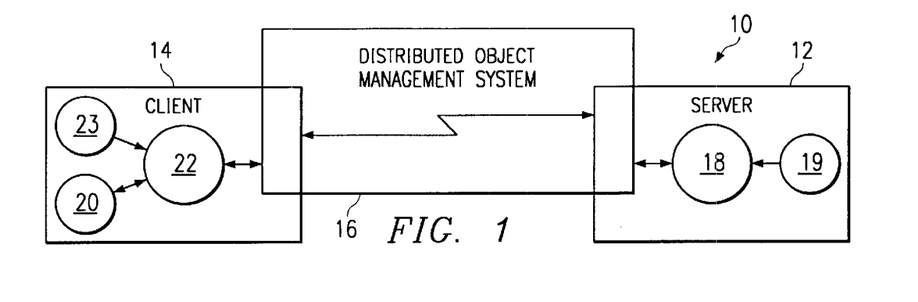
FIG. 1 illustrates a block diagram of a distributed object management system.

Referring to FIG. 1, a distributed processing computer system generally indicated at 10 is illustrated that comprises one or more server systems 12 and one or more client systems 14. The client/server computer systems allow for decentralized computing including the ability to manipulate data which is resident on a remote system. The server system 12 and client system 14 may comprise a personal computer, mini computer, main frame computer, or any other suitable computer type device. In a computer network environment, each computer is assigned a unique address. Therefore, if data, code or objects exist on a different computer, it exists in a different address space.

The client system 14 requests access to data or services that may be contained on server system 12. Server system 12 may then process the request and approve access as requested by client system 14. Client system 14 is connected to server system 12 via a distributed object management system 16 operating across a computer network. The distributed object management system 16 handles the communications between client system 14 and server system 12. Without distributed object management system 16, distributed processing could not take place since client system 14 would not be able to determine the location of or obtain access to the requested data or services. The distributed object management system 16 may comprise Voyager, a distributed network communications system developed by ObjectSpace, Inc., CORBA (Common Object Request Broker Architecture), a technology for inter-object communications developed by a consortium of companies, DCOM, an inter-application communications system for networked computers developed by Microsoft, RMI, an inter-object communications system for networked computers developed by Sun Microsystems, Inc., or any other suitable distributed object management system.

An object is an instance of a class within the programming methodology of object oriented programming. The present invention may be implemented using the Java language, developed by Sun Micro Systems, Inc., or any other suitable computer language.

When an object class source code description is created in the Java language, it is stored on a storage device as a .java file. Upon compilation, the object class executable code is represented as a .class file on the storage device. When an object is needed, a new instance, as prescribed by the .class file is created, and it is then referred to as an object. Server system 12 may contain one or more subject objects 18 for which client system 14 may issue a request for access. In such a case, subject object 18 is the subject of client system's 14 request. Client system 14 may contain one or more local objects 20. Local object 20 can itself be a subject object, and subject object 18 can itself be a local object depending on what computer, or address space, is making the request for access. For purposes of illustrating the present invention, local object 20 and subject object 18 exist in different address spaces. However, both local object 20 and subject object 18 could reside on the same computer and still invoke the system and method of the present invention.

Local object 20 may request access to subject object 18. This request invokes the distributed object management system 16. In order to isolate the distributed processing communication requirements from local object 20, a remote proxy object 22 may be created on server system 12 and loaded onto client system 14. Remote proxy object 22 has an interface and list of methods identical to subject object 18. Remote proxy object 22 is so named since it is remote from subject object 18, and it provides a local representative for an object which may reside in a different address space. Remote proxies in general are responsible for encoding a request and its arguments and sending the encoded request to the subject object that may exist in a different address space. Remote proxies also hide the location of the subject object from the requesting local object. Therefore, any local object can assume, from an access point of view, that any object it needs is local. Local object 20 communicates with remote proxy object 22 which then communicates with subject object 18 via distributed object management system 16. By doing this, local object 20 is unconcerned with the location of subject object 18.

Currently, a system developer must anticipate all necessary remote proxies and create the remote proxy classes. Some distributed object management systems have a utility which augments the build process by allowing remote proxy classes to be built when the system is compiled. Although this process minimizes the system developer's effort, it still involves system developer intervention, computer resources and time. Another disadvantage with current distributed object management systems is that these remote proxy classes must be kept in sync with the subject classes as the subject classes and interfaces are modified. Another disadvantage with current distributed object management systems is that all remote proxy classes must be stored on the computer and available for use when needed. This creates high overhead in developer effort, computer storage and processing requirements.

In contrast, a system constructed using the present invention dynamically generates remote proxy classes as needed at run-time. There are several advantages of this method. The primary advantage is reduced system development time since the system developer does not have to manually generate remote proxy classes when the system is initially compiled or manually regenerate remote proxy classes each time a subject object class is modified. The system of the present invention also reduces computer program storage requirements since remote proxy classes are not a permanent part of the operating environment. It also minimizes compile and load time for the computer program since remote proxy classes do not have to be generated at compile and load time. In order to optimize system performance, generated remote proxy classes remain in memory until the distributed object management system is shut down.

Dynamic Generation of Remote Proxies

Referring again to FIG. 1, the dynamic generation of remote proxies may be accomplished by parsing the .class or .java file for subject object 18 and creating a .java file for remote proxy object 22 which contains the interfaces and methods of the subject object 18. The Java compiler may then be invoked to compile the .java file into a .class file for remote proxy object 22. The compiled .class file can then be loaded into the computer system via a class loader which is a standard element in a Java environment. A .class file must be loaded before it is available for use by distributed processing computer system 10. Once the .class file is loaded, a new instance of the compiled .class file may be created which will be remote proxy object 22.

The process of parsing the subject object 18 .class (subject class 19) or .java file, creating a source code file for remote proxy class 23, compiling, loading, and creating a new instance may be excessively slow at run-time. In order to address this issue, a reflection process may be used on subject object 18 to determine its name, interfaces and list of methods and then to directly generate the byte codes into a .class file, subject class 19. The byte codes are the executable code stored in a .class file. The .class file can then be loaded into the computer system with the class loader. This embodiment eliminates the need to parse the .class file, create a .java source code file, and shell out the .java file to a compiler since the byte code generation process occurs as part of the dynamic generation of remote proxies. This entire process of dynamic generation of remote proxies will be discussed in detail with reference to FIGS. 2, 3 and 4.

Figure 2:
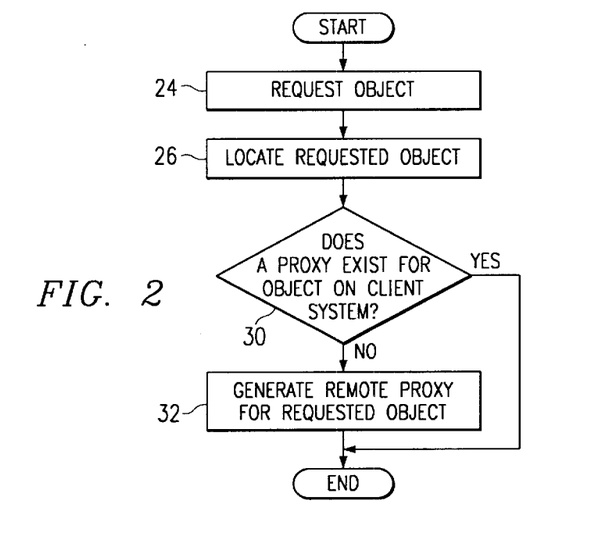
FIG. 2 illustrates a flow diagram of a method for determining when to dynamically generate remote proxy classes.

Referring to FIG. 2, the process of determining whether a remote proxy is necessary is invoked via a request from local object 20 for access to subject object 18. The method begins at step 24 where local object 20 on client system 14 requests access to subject object 18 on server system 12. This request could be for any object whether it is local or remote and in a different address space. The system of the present invention generates and utilizes remote proxy objects in all inter-object communication to provide additional processing support. Thus, any communication between objects, regardless of their location, utilizes remote proxy objects. These remote proxy objects act as a middle man between the requested object and the requesting object to provide additional processing functionality such as increased security.

Referring again to FIG. 2, the method then proceeds to step 26 where the requested object is located on either client system 14 or server system 12. The method proceeds to step 30 where a determination is made regarding the need for a remote proxy class. If remote proxy class 23 already exists on client system 14, then the method terminates since remote proxy classes are not removed from client system 14 until the distributed object management system 16 is shut down. However, if remote proxy class 23 does not exist on client system 14, the method then proceeds to step 32 where remote proxy class 23 is generated on server system 12 and loaded onto client system 14 based on the name, interfaces and methods of subject object 18. A method for generating remote proxies is described in detail with reference to FIGS. 3 and 4.

Figure 3:
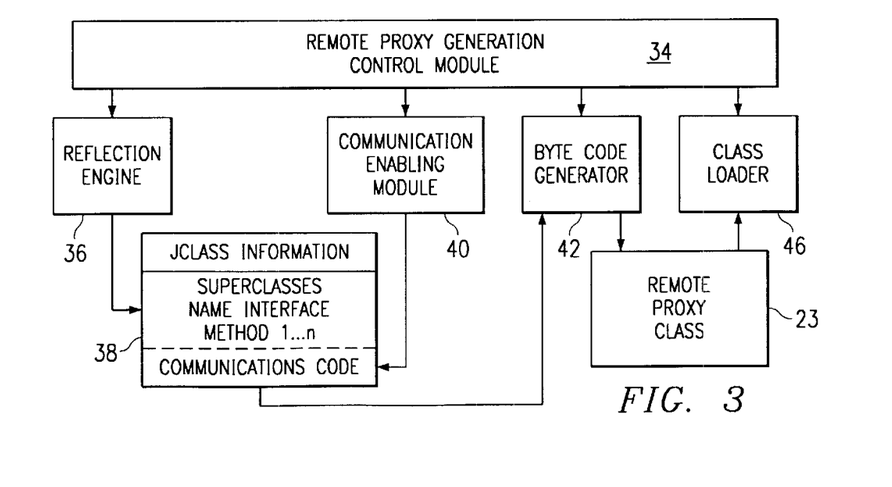
FIG. 3 illustrates a block diagram of a system for dynamically generating remote proxy classes.

FIG. 3 is a functional diagram of the portions of distributed object management system 16 that are used to create remote proxy classes as necessary. Remote proxy generation control module 34 is invoked at step 32 in FIG. 2. When the distributed object management system 16 invokes the remote proxy generation control module 34, the method previously described has already determined that the remote proxy class 23 does not yet exist on client system 14. Remote proxy generation control module 34 generates remote proxy 22 on client system 14 so local object 20 can communicate with subject object 18 via distributed object management system 16.

As previously discussed, in object oriented programming, an object is an instance of a class. Classes may be defined in a class hierarchy where each class inherits the attributes of all of its ancestors. Inheritance is a concept that maps related classes onto each other in a hierarchical way. This allows a descendant of a class to inherit all of its variables and methods from its ancestors as well as create its own. The immediate ancestor of a class is known as the class' superclass. Therefore, in order to determine all of a class's attributes, all of the class's ancestors, or superclasses, should be determined.

To fully define a remote proxy for a subject object, remote proxies should be generated for each of the subject object's superclasses. By generating these superclass remote proxies, the remote proxy for the subject object will inherit all of the variables and methods of its ancestors, or superclasses. An alternative to generating superclass remote proxies includes adding all of the superclass methods and interface requirements to the remote proxy class. By adding the superclass information to the remote proxy class, the need for generating superclass remote proxies is eliminated.

Referring again to FIG. 3, remote proxy generation control module 34 first invokes reflection engine 36 to determine information regarding subject class 19. The process of reflection operates on subject class 19 which is the Java .class file for subject object 18. Although for illustrative purposes, subject object 18 and its Java .class file, subject class 19, exist on server system 12, subject class 19 could exist on either client system 14 or server system 12. Therefore, the dynamic generation of remote proxy classes as described in the present invention could take place on either client system 14 or server system 12.

Reflection is a process that determines what an object can do, how it is defined, and how it communicates with other objects. Reflection mirrors the public view of an object to collect information to facilitate the creation of proxies that resemble objects on the public view, but are very different internally, or privately. The public view of an object represents the information external objects must know in order to communicate with the first object. Proxies need to be reflections, or duplicates on the surface, of objects since proxies perform specific tasks such as controlling access to or communications with the objects they represent. Thus, proxies need to look like the object on the outside, but on the inside, proxies contain unique computer code to accomplish their assigned function. The reflection process is only concerned with determining the public view of an object. Therefore, the information determined by the reflection process includes the following: name; list of implemented interfaces; list of methods; and superclass information.

Continuing with FIG. 3, reflection engine 36 issues queries against subject class 19, which is the .class file for subject object 18, to determine each of subject class 19 superclasses, its name, its interfaces, and each of its methods. The results of these queries are temporarily stored within remote proxy generation control module 34 as JClass information 38. JClass information 38 is a temporary storage area for the name, superclasses, interfaces, and methods of subject class 19. JClass information 38 could also include the name, interfaces, and methods of each of subject class 19 superclasses.

If subject class 19 has superclasses, a remote proxy may be first generated for each superclass using the system and method described with reference to the present invention. After the superclass remote proxies are generated, JClass information 38 contains the name, interface, and list of methods for subject class 19. An alternate methodology for providing superclass methods and interfaces for the remote proxy class is to add all superclass method and interface information to the remote proxy class. By doing this, the need for separate superclass remote proxies is eliminated.

Once the name, interface, methods, and superclass information are determined for subject class 19, a communication enabling module 40 adds to JClass information 38 the computer code necessary for remote proxy object 22 to communicate with subject object 18 via distributed object management system 16. The communication enabling module 40 inserts the computer code into JClass information 38 which is the definition of all the information that remote proxy object 22 needs to function within distributed object management system 16.

Since a remote proxy's purpose is to communicate with a subject object that may exist either in a different address space or in the same address space, the remote proxy contains essentially the following information: interfaces identical to the subject object; a list of methods identical to the subject object; and computer code necessary for the remote proxy to communicate with the subject object. In an alternate embodiment of the present invention, the remote proxy would contain all of the information mentioned above and the interfaces and methods of all of the subject object's superclasses.

At this point, JClass information 38 contains subject object's 18 name, interfaces, methods, and the computer code necessary for communications within distributed object management system 16. JClass information 38 could also contain the superclass information for subject object 18. The next function invoked by remote proxy generation control module 34 is byte code generator 42. The purpose of byte code generator 42 is to directly generate the executable code corresponding to JClass information 38. JClass information 38 is the definition of the Java class of which remote proxy object 22 is an instance. That is, JClass information 38 is the definition of remote proxy class 23. Byte code generator 42 reviews JClass information 38 and generates the corresponding byte codes, or executable code, into remote proxy class 23 which is a Java .class file. As previously discussed, a Java class file is executable code that defines a Java class.

Byte code generator 42 is a collection of Java classes that are capable of taking the description of the needed proxy class in JClass information 38 and directly generating the executable Java code in memory. The function of byte code generator 42 is similar to that of a Java compiler. Like a Java compiler, byte code generator 42 generates executable Java code. However, the inputs are different. A compiler requires a source code file containing a string of bytes that is the sequence of statements for a Java object definition. The string of bytes is parsed by the Java compiler and translated into executable Java code. In contrast, byte code generator 42 takes general information regarding the needed Java object and directly generates executable Java code without the need for the intermediate step of creating a Java source file. This technique yields considerable time savings since several steps are omitted. For example, like a Java compiler, byte code generator 42 generates a hexadecimal "CAFEBABE" to indicate to the Java virtual machine that a Java .class file begins at that point in memory. Byte code generator 42 is constructed in such a way that the byte codes are generated in the sequence required by the Java virtual machine.

For each Java construct, byte code generator 42 writes the appropriate header information and hexadecimal byte codes representing the Java construct into computer memory. Thus, there is a block of code, or hexadecimal bytes, for each Java construct. As described above, JClass information 38 contains the computer code necessary for communications within distributed object management system 16. Byte code generator 42 translates this communications information into byte codes recognizable to the Java virtual machine. When byte code generator 42 terminates, the string of hexadecimal bytes necessary to define the proxy class has been stored in memory as remote proxy class 23 which is an executable Java .class file. Remote proxy class 23 has a unique name which is derived from subject class 19 name. For example, if subject class 19 is named "Foo.class", its remote proxy class 23 name would be "Foo_Proxy.class".

Before remote proxy class 23 can be used, it must be loaded onto client system 14 utilizing a class loader 46. Class loader 46 may comprise any number of suitable programs which exist in typical object oriented programming environments. The class loader 46 will then create remote proxy object 22 which is an instance of remote proxy class 23 generated by byte code generator 42.

Figure 4:
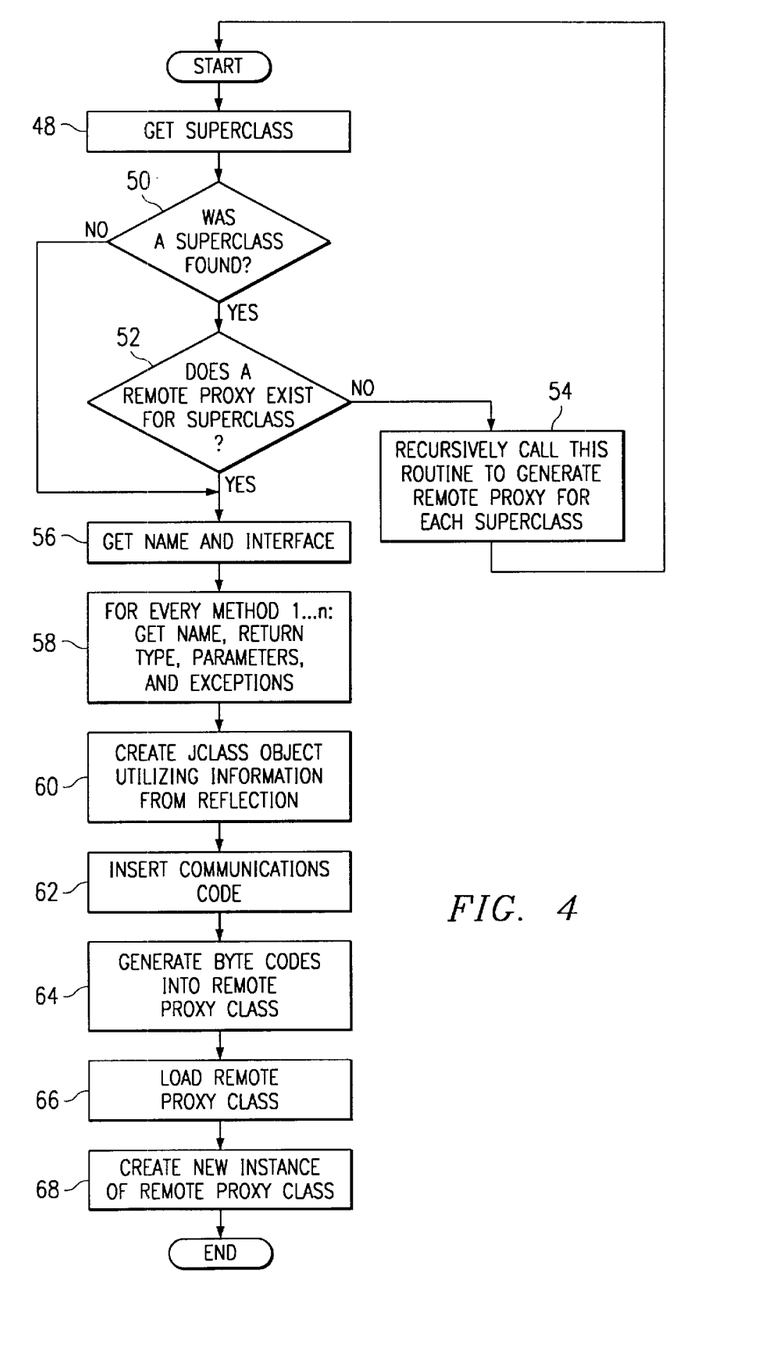
FIG. 4 illustrates a flow diagram of a method for dynamically generating remote proxy classes.

FIG. 4 is a flow diagram that illustrates the process of generating a remote proxy when invoked by step 32 in FIG. 2 and as represented in general by the block diagram in FIG. 3. The method begins at step 48 where the reflection engine 38 queries subject class 19 to determine its superclass. The method then proceeds to step 50 where a determination is made regarding the existence of a superclass for subject class 19. If a superclass is found for subject class 19, then the method proceeds to step 52 where a determination is made regarding the existence of the remote proxy class on client system 14 representing subject class' 19 superclass. If a remote proxy class does not exist for subject class' 19 superclass, the method proceeds to step 54 where the remote proxy class is generated for subject class, 19 superclass by recursively invoking the remote proxy generation control module 34. Thus, step 54 recursively invokes the method illustrated in FIG. 4.

Referring to step 52, if the remote proxy class does exist on client system 14 for subject class' 19 superclass, then the method proceeds to step 56 (described below) since remote proxy classes already exist for all of subject object's 18 superclasses.

In an alternate embodiment of the present invention, instead of recursively generating remote proxy classes for each of subject class 19 superclasses, the interfaces and methods of each of subject class 19 superclasses are stored in JClass information 38 and are later used in the generation of remote proxy class 23. In the alternate embodiment, steps 48–54 would not exist in their current form. Instead, these steps would consist of determining the names, interfaces, and methods of all of subject class 19 superclasses and storing the information in JClass information 38.

Referring to step 50 if a superclass does not exist for subject object 18, then the method proceeds to step 56 where reflection engine 36 queries subject class 19 to determine subject class' 19 name and interface. The method then proceeds to step 58 where reflection engine 38 queries subject class 19 regarding its methods. Reflection engine 36 issues queries for each of subject class' 19 methods until all methods are determined. For each of subject class' 19 methods, the software system determines the method name, return type, parameters, and exceptions and stores the information in JClass information 38.

The method then proceeds to step 60 where reflection engine 36 creates JClass information 38 from the name, interface, and methods information determined in steps 56 and 58. The method then proceeds to step 62 where communication enabling module 40 inserts in JClass information 38 the computer code, in the form of an expression tree, necessary for remote proxy object 22 to communicate with subject object 18 via distributed object management system 16.

The method then proceeds to step 64 where byte code generator 42 generates the executable code representing JClass information 38 into remote proxy class 23. The method then proceeds to step 66 where class loader 46 loads remote proxy class 23 onto client system 14 where it is now available for use. The method then proceeds to step 68 where remote proxy object 22 is generated as a new instance of remote proxy class 23 which was loaded in step 66.

Light Proxy/Light Client

Figure 5:
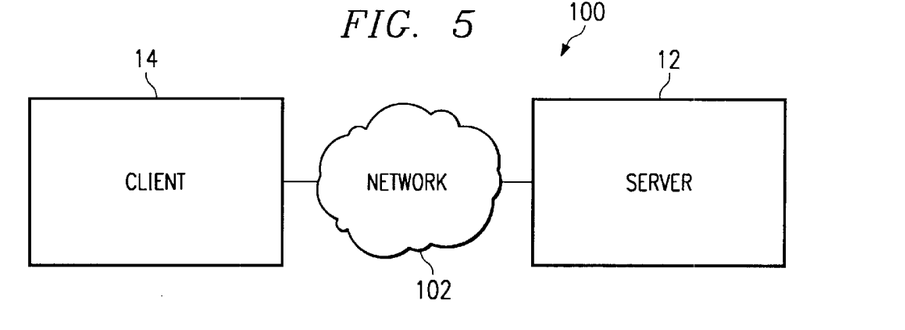
FIG. 5 illustrates a block diagram of a client/server network.

Referring to FIG. 5, a client/server system is generally indicated at 100. Client/server system 100 consists of a client system 14 and a server system 12 linked by a network 102. Client/server system 100 may be any suitable distributed processing system including distributed processing computer system 10. Network 102 may comprise an internet or other suitable network connecting client system 14 with server system 12. Distributed object management system 16 runs on both client system 14 and server system 12 and facilitates communications across network 102.

Figure 6A:
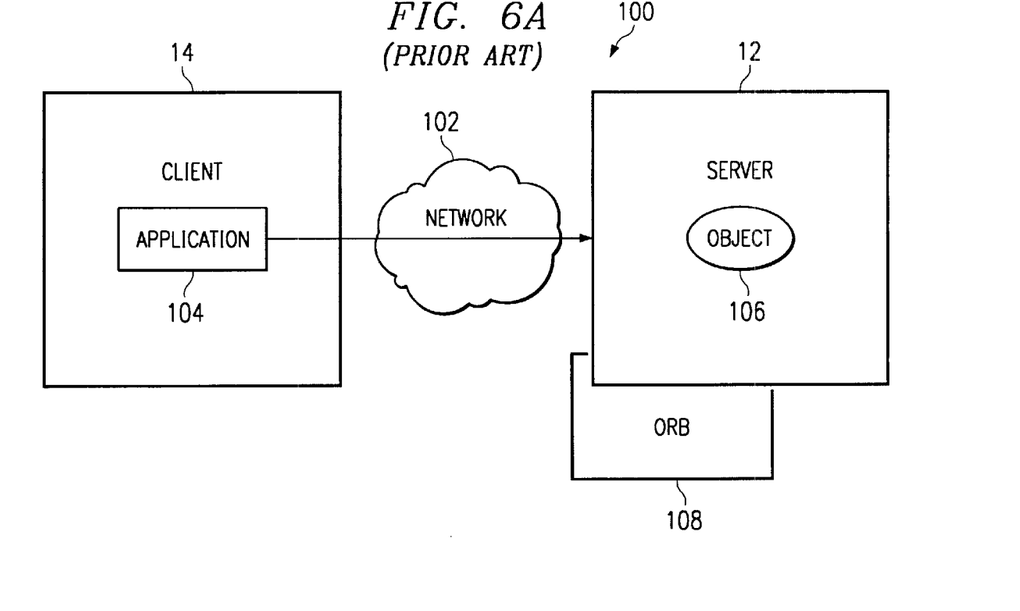
FIGS. 6(a) and 6(b) illustrate block diagrams of the client/server network as communications take place across the network.

Referring to FIG. 6(a), client system 14 includes a client application 104 that accesses a server object 106 on server system 12. Server system 12 includes a server-side ORB 108 to facilitate interapplication and interobject communications across network 102. An example of this type of client/server system would be the WorldWide Web operating across the Internet. The client system 14 would typically be a personal computer connected to the Internet. The server system 12 would typically be a web server hosting web pages and other network resources. The server system 12 typically has a server-side object request broker (ORB) 108 to facilitate communications across the Internet. Client system 14 typically does not have a resident ORB. For communications to take place across network 102, an ORB should be present on client system 14.

Figure 6B:
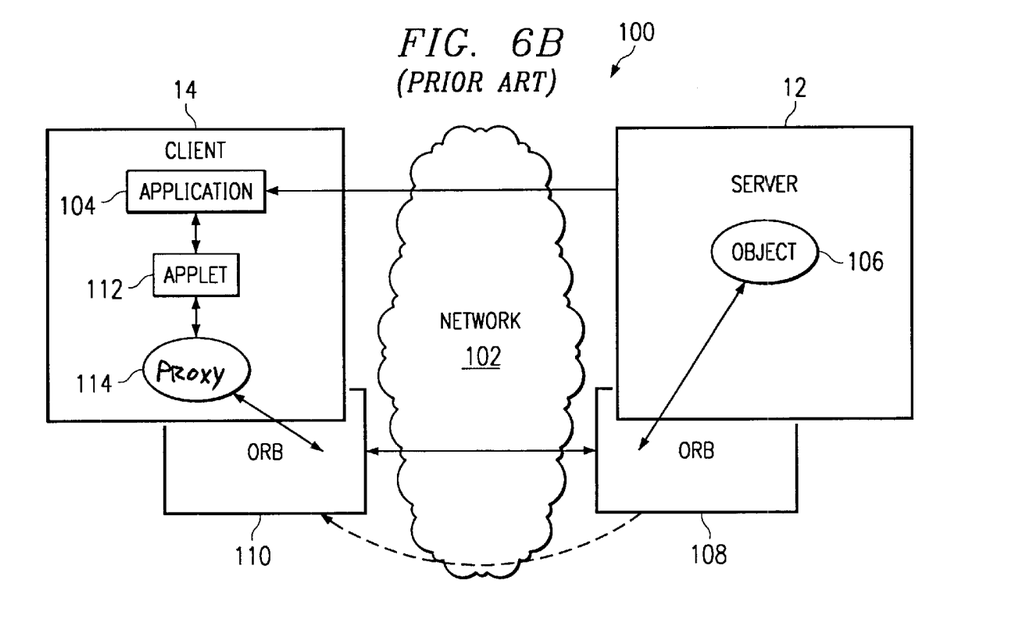

Referring to FIG. 6(b), the conventional process of interapplication and interobject communication is illustrated. Client application 104 requests access to server system 12. Server system 12 may respond to the request for access by uploading an application onto client system 14, uploading an applet onto system 14, or providing access to a server object 106. In one embodiment, server system 12 uploads an applet 112 to client system 14. Applet 112 executes on client system 14 and accesses server object 106. When applet 112 is uploaded to client system 14, server system 12 uploads a copy of server-side ORB 108 to client system 14 where it executes as client-side ORB 110. Applet 112 is coupled to server-side ORB 108 and pulls server-side ORB broker 108 over to client system 14 when applet 112 is uploaded. Applet 112 is coupled to server-side ORB 108 to ensure proper inter application and interobject communication support on client system 14.

Interapplication and interobject communications across network 102 are handled by server-side ORB 108 and client-side ORB 110. In order for server-side ORB 108 to function properly, it should communicate directly with a corresponding ORB on client system 14. Server-side ORB 108, client-side ORB 110, and network 102 comprise the component parts of distributed object management system 16. In this example, the client-side ORB 110 completes the connection between client system 14 and server system 12.

To comply with ORB processing requirements, a request for access to server object 106 from client system 14 causes a proxy 114 to be generated for server object 106 by server-side ORB 108 using the previously described method for dynamically generating remote proxies. Server-side ORB 108 uploads proxy 114 to client system 14. Applet 112 communicates directly with proxy 114, and proxy 114 communicates with server object 106 through client-side ORB 110, network 102, and server-side ORB 108. Uploading a duplicate of server-side ORB 108 can be quite lengthy since server-side ORB 108 may be very large. Typically, the size of server side ORB 108 may be on the order of 1,000,000 bytes (1 megabyte) or more.

Figure 7:
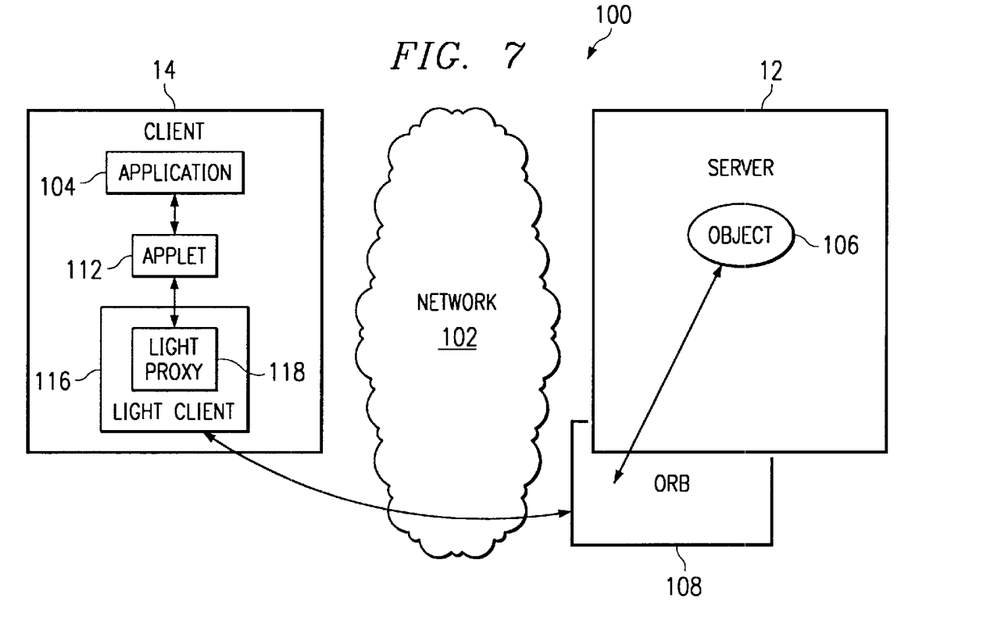
FIG. 7 illustrates a block diagram of a system for using a light client and light proxy in communications across the client/server network.

Referring to FIG. 7, a client/server system is generally indicated at 100. Client/server system 100 uses a reduced size client-side ORB to reduce lengthy uploads from server system 12 to client system 14. Client application 104 executing on client system 14 may request access to server system 12. Client application 104 may be an application resident on client system 14 or an applet uploaded onto client system 14. Server system 12 may respond by uploading an applet 112 to client system 14. In another embodiment, server system 12 uploads a full functioning application onto client system 14. In that embodiment, the full functioning application would then communicate with server system 12. In yet another embodiment, server system 12 may respond to the request for access by providing access to a server object 106.

A server-side ORB 108 executes on server system 12. Server-side ORB 108 provides interapplication and interobject communications support between server system 12 and client system 14. Server-side ORB 108 communicates with a similar ORB executing on client system 14.

Unlike conventional distributed processing systems where applet 112 is coupled to an ORB, the present invention decouples applet 112 from the ORB. Thus, a copy of server-side ORB 108 is not uploaded to client system 14 when applet 112 is uploaded. Instead, server-side ORB 108 uploads a light client 116. In one embodiment, the size of light client 116 is on the order of 15,000 bytes (15 kilobytes). The relatively small size of light client 116 considerably reduces the time needed to upload light client 116 onto client system 114.

Light client 116 may include the basic functionality necessary for applet 112 on client system 14 to request services from server system 12 and receive responses from server system 12. In one embodiment, applet 112 on client system 14 communicates with server object 106 on server system 12 through light client 116 (client-side) and server-side ORB 108. In an embodiment, the basic functionality of light client 116 is provided by a set of eight classes as follows:

(1) a light proxy class that defines a generic light proxy;
(2) a light proxy holder class to provide compatibility with other ORBs;
(3) a name space class to provide an application program interface for a specific ORB;
(4) a light proxy resource loader class to provide class loading over the network;
(5) an object not found exception class;
(6) a light input stream class to facilitate reception of input to the light client 116;
(7) a light output stream class to facilitate output from light client 116; and
(8) an Inaming service class to provide an interface for the name space class.

These classes provide light client 116 with the ability to invoke methods of server object 106 through server-side ORB 108. These classes also provide light client 116 with the ability to receive responses to its method invocations from server object 106 through server-side ORB 108. These classes do not provide light client 116 with the ability to respond to any method invocations from server system 12.

Applet 112 may request access to a server object 106. Upon receiving the request for access, server-side ORB 108 generates a remote proxy for server object 106 using the previously described dynamic generation of remote proxies procedure. The remote proxy is referred to as a light proxy 118 since it is used in conjunction with light client 116. Server-side ORB 108 uploads light proxy 118 into light client 116 on client system 14. Unlike conventional distributed processing systems where the remote proxy is coupled to the ORB, light proxy 118 is decoupled from an ORB and is part of light client 116. Decoupling light proxy 118 from the ORB prevents server-side ORB 108 from being pulled up to client system 14 when light proxy 118 is uploaded into light client 116. This reduces the size of the upload and proportionally reduces the amount of time required to upload light proxy 118.

Remote proxies used in conventional distributed processing systems depend upon classes contained in the ORB that is uploaded to client system 14. The light proxy 118 of the present invention carries all needed classes within its definition. Encapsulating all needed classes into the light proxy 118 allows the light proxy 118 to be decoupled from the server-side ORB 108. Thus, an upload of the light proxy 118 does not result in an upload of the server-side ORB 108.

Figure 8:
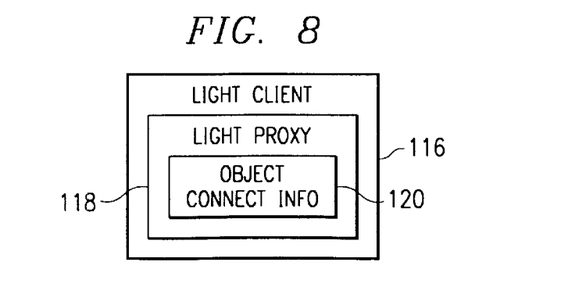
FIG. 8 illustrates a block diagram of the structure of the light client.

Referring to FIG. 8, the structure of light client 116 is illustrated. Light client 116 provides the basic client-side communications functionality so that client system 14 can communicate with server system 12. As each of one or more light proxies 118 is generated, it is uploaded into light client 116. Therefore, light client 116 expands in size with the addition of each light proxy 118. An applet 112 may request access to several server objects 106 causing the generation of a light proxy 118 for each of the accessed server objects 106. Within each light proxy 118, an object connect information 120 defines the information necessary to access the associated server object 106 on server system 12. Server-side ORB 108 generates light proxy 118 using the previously described method for dynamically generating remote proxies in a light proxy generation module.

Figure 9:
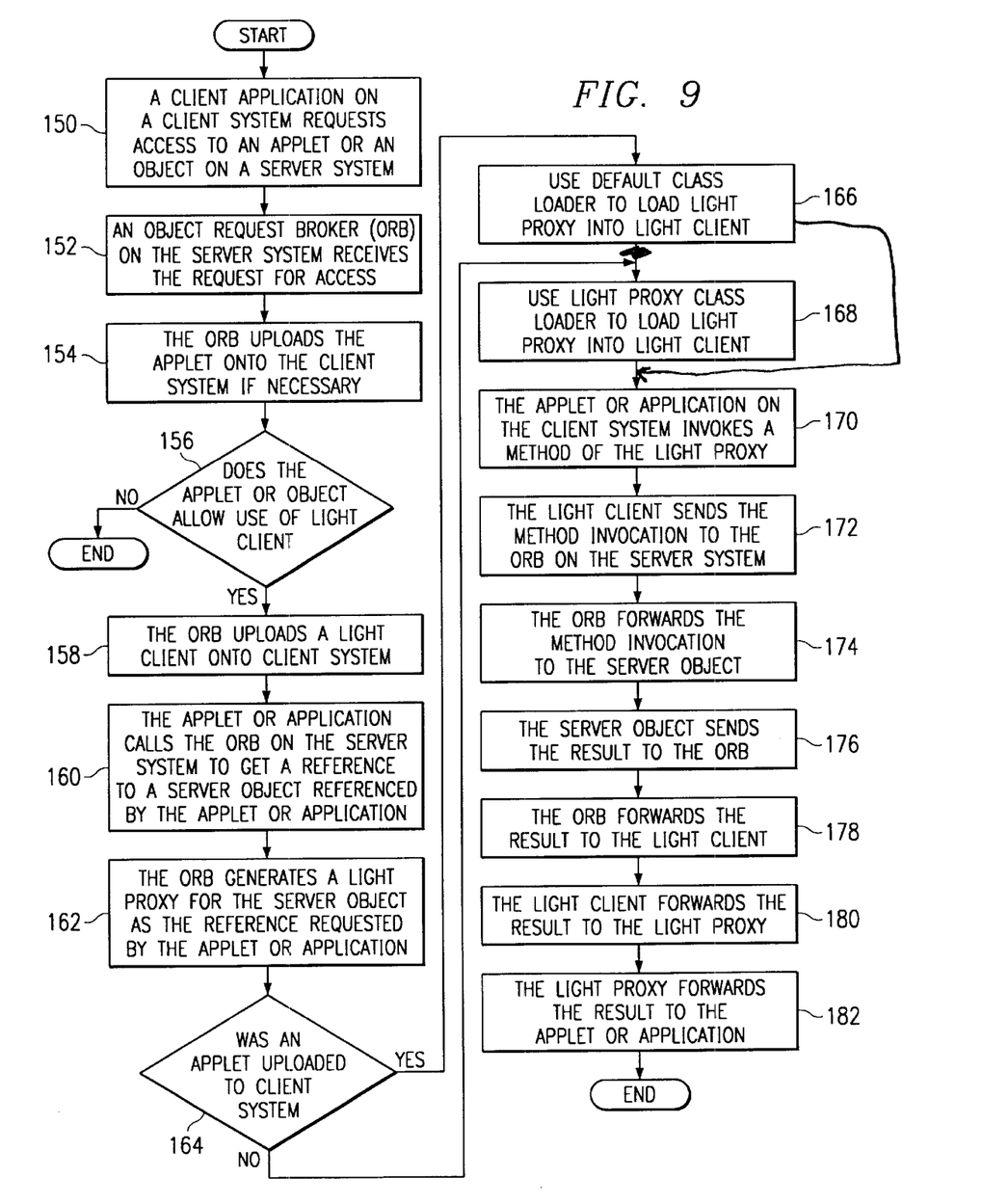
FIG. 9 illustrates a flow diagram of a method for communications across the client/server network using the light client and light proxy.

Referring to FIG. 9, a flow diagram illustrates the process of interapplication and interobject communications between client system 14 and server system 12 across network 102 using server-side ORB 108 as the server-side part of distributed object management system 16 and light client 116 as the client-side part of distributed object management system 16. The process commences at step 150 where client application 104 on client system 14 requests access to an applet, object, or application resident on server system 12.

Although the present invention is described with relation to a client application requesting access to an applet or object on server system 12, any communications between client system 14 and server system 12 may utilize the present process.

The process proceeds to step 152 where server-side ORB 108 receives the request for access from client application 104. In distributed computing systems, object request brokers (ORBs) provide communication support for communications between clients and servers. Thus, communications across network 102 are handled by the ORBs.

The process proceeds to step 154 where server-side ORB 108 uploads the applet onto client system 14 if necessary. In one embodiment, client application 104 requests access to the server object 106. In that embodiment, applet 112 would not be uploaded to client system 14. In yet another embodiment, server-side ORB 108 may upload an application onto client system 14.

The process proceeds to decisional step 156 where a decision is made regarding whether the applet or requested object allows the use of light client 116. In one embodiment, this decision is made by determining what features of server-side ORB 108 are used by the requested applet or object. If only basic functionality is required or an ORB is already loaded on client system 14 that is not compatible with server-side ORB 108, then light client 116 may be used to provide client-side communication support.

In another embodiment, the determination of whether an applet requires a full ORB or a light client is made by referencing a flag on an associated web page hosted by server system 12. The flag indicates whether the requested applet can function with the light client 116 or whether it requires the full server-side ORB 108 for proper functioning. In yet another embodiment, a web page on server system 12 queries the connection speed of the connection between client system 14 and server system 12 to determine whether an upload of the full server-side ORB 108 would be unnecessarily time consuming. If a fast enough connection exists, an upload of the full server-side ORB 108 would, not introduce unacceptable delay into the connection between client system 14 and server system 12.

If the requested applet or object does not allow the use of light client 116, the NO branch of decisional step 156 terminates the process. At this point, the process follows the conventional distributed processing methodology and uploads a copy of server-side ORB 108. If the requested applet or object allows the use of light client 116, the YES branch of decisional step 156 leads to step 158 where server-side ORB 108 uploads light client 116 onto client system 14. Light client 116 provides basic client-side communications support to facilitate interapplication and interobject communications between client system 14 and server system 12.

The process proceeds to step 160 where applet 112 invokes a call to server-side ORB 108 to obtain a reference to a server object 106 referenced by applet 112. In another embodiment, applet 112 may be an application resident on client system 14 or uploaded onto client system 14 from server system 12.

The process proceeds to step 162 where server-side ORB 108 generates a light proxy 118 for server object 106. Light proxy 118 provides a local reference on client system 14 for use by applet 112. Server-side ORB 108 generates light proxy 118 by using the previously described dynamic generation of remote proxies procedure.

The process proceeds to decisional step 164 where a decision is made regarding whether an applet was uploaded to client system 14. Recall that uploading of applet 112 is but one way of utilizing the light client and light proxy communication process of the present invention. If an applet was uploaded to client system 14, the YES branch of decisional step 164 proceeds to step 166 where a default class loader is used to load light proxy 118 into light client 116. The default class loader is a standard class provided with an object oriented programming environment such as Java. If an applet was not uploaded to client system 14, the NO branch of decisional step 164 proceeds to step 168 where the light proxy class loader is used to load light proxy 118 into light client 116.

Both step 166 and step 168 proceed to step 170 where applet 112 on client system 14 invokes a method of light proxy 118. Light proxy 118 has an interface and list of methods identical to the associated server object 106 on server system 12. When applet 112 invokes a method of light proxy 118, the actual code in applet 112 invokes a method on server object 106. However, since server object 106 resides in a different address space, distributed object management system 16 provides a remote proxy, light proxy 118, for use by applet 112.

The process proceeds to step 172 where light client 116 transmits the method invocation of step 170 across network 102 to server-side ORB 108 on server system 12. The process proceeds to step 174 where server-side ORB 108 forwards the method invocation of step 170 to server object 106. The process proceeds to step 176 where server object 106 performs the method invoked by applet 112 and forwards the result to server-side ORB 108.

The process proceeds to step 178 where server-side ORB 108 forwards the result of the method invoked by applet 112 to light client 116 across network 102. The process proceeds to step 180 where light client 116 forwards the result of the method invoked by applet 112 to light proxy 118. The process proceeds to step 182 where light proxy 118 provides the result of the method invocation to applet 112. In another embodiment, the method invocation of server object 106 is initiated by client application 104 or an application uploaded to client system 14 from server system 12.

Thus, it is apparent that there has been provided in accordance with the present invention a system and method of communication in a distributed processing environment that satisfies the advantages set forth above such as reduced time to upload a client-side ORB. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A system for communication in a distributed computing environment, comprising:

a server system having one or more server objects, the server system having a server-side object request broker executing on the server system, the object request broker providing server-side communications support in a distributed computing environment;

a client system having a client application, the client system linked to the server system, the client system not having an executing client-side object request broker;

a light client executing on the client system, the light client providing client-side communications support in the distributed computing environment, the light client communicating with the object request broker to provide client system to server system communications, the light client being uploaded from the server system without uploading the server-side object request broker, the server-side object request broker operable to directly communicate with the server object and the light client; and a light proxy generator executing on the server system, the light proxy generator operable to dynamically generate a light proxy in response to a request from the client application for access to one of the one or more server objects, the light proxy being uploaded to the client system in response to a request from the client application to provide a client system reference to one of the one or more server objects, the light proxy providing a local communication link between the client application and the light client, the light proxy being decoupled from the server-side object request broker.

2. The system of claim 1, further comprising an internet providing the network link between the client system and the server system.

3. The system of claim 1, wherein the light client includes a subset of the functionality of the server-side object request broker.

4. The system of claim 1, wherein the light client includes the ability to invoke methods of the one or more server objects and to receive results from the one or more server objects.

5. The system of claim 1, wherein the light proxy is decoupled from the server-side object request broker.

6. The system of claim 1, wherein the light client includes the light proxy.

7. The system of claim 1, wherein the light client includes fewer bytes by a factor of 100 than the server-side object request broker.

8. A method for communications in a distributed computing environment, comprising:

requesting a method of a server object by a client application, the server object existing on a server system, the client application existing on a client system, the client system linked to the server system by a network, the server system including a server-side object request broker, wherein the client system does not have a client-side object request broker;

receiving the request in the server-side object request broker on the server system, the server-side object request broker providing server-side network communications support;

generating a light proxy for the server object in response to the request from the client application, the light proxy decoupled from the server-side object request broker;

uploading the light proxy and a light client onto the client system without uploading the server-side object request broker to the client system, the light client providing client-side network communications support;

invoking the method of the server object by the object request broker;

sending a result of the method invocation to the light proxy directly through the server-side object request broker and the light client;

forwarding the result from the light proxy to the client application.

9. The method of claim 8, wherein the light client is uploaded to the client system prior to the light proxy.

10. The method of claim 8, wherein sending a result of the method invocation includes:

sending the result of the method invocation to the server-side object request broker on the server system;

transmitting the result to the light client on the client system across the network; and forwarding the result from the light client to the light proxy.

11. The method of claim 8, further comprising:

forwarding the request from the client application to the server-side object request broker on the server system.

12. The method of claim 8, further comprising:

receiving the result of the method invocation in the server-side object request broker on the server system.

13. A method for communications in a distributed computing environment, comprising;

requesting access to a server item on a server system by a client application on a client system, wherein the client system does not have a client-side object request broker;

receiving the request for access in a server-side object request broker;

uploading the server item to the client system;

uploading a light client from the server system to the client system without uploading the server-side object request broker to the client system, the light client providing client-side communications support;

requesting access to a server object from the uploaded server item on the client system;

generating a light proxy for the server object, the light proxy decoupled from the server-side object request broker;

uploading the light proxy into the light client;

invoking a method of the light proxy by the uploaded server item;

transmitting the method invocation from the light proxy to the server-side object request broker through the light client;

receiving the method invocation in the server-side object request broker;

forwarding the method invocation from the server-side object request broker to the server object;

sending a result of the method invocation to the server-side object request broker;

transmitting the result to the light client on the client system;

forwarding the result from the light client to the light proxy; and forwarding the result from the light proxy to the uploaded server item.

14. The method of claim 13, wherein the server item is an applet.

15. The method of claim 13, wherein the server item is an application.

16. The method of claim 13, wherein the light proxy is generated by the server-side object request broker.

17. The method of claim 13, further comprising using a class loader to load the light proxy into the light client on the client system.

* * * * *